Figure 1:
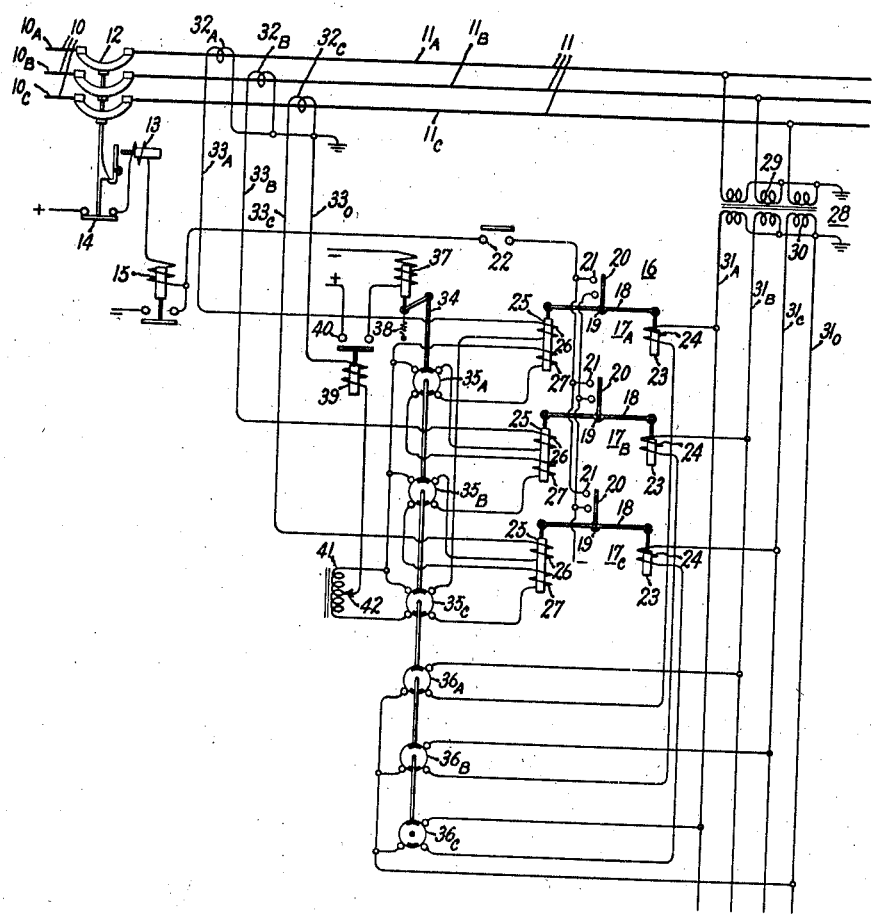

March 30, 1943.  A. R. VAN C. WARRINGTON  2,315,468
PROTECTIVE SYSTEM
Filed Jan. 21, 1941  2 Sheets-Sheet 1

Inventor:
Albert R. van C. Warrington,
by Harry E. Dunham
His Attorney.

Patented Mar. 30, 1943

2,315,468

UNITED STATES PATENT OFFICE 2,315,468

PROTECTIVE SYSTEM

Albert R. van C. Warrington, Wallingford, Pa., assignor to General Electric Company, a corporation of New York Application January 21, 1941, Serial No. 375,208

10 Claims. (Cl. 175—294)

My invention relates to protective systems for electric circuits and more particularly to protective systems employing relays of the distance type.

Electric circuits, as is well known to those skilled in the art, are subject to several different kinds of faults. A polyphase electric circuit, for example, and more particularly the common three-phase electric circuit, may be subject to phase-to-phase faults, three-phase faults, phase-to-ground faults, or a combined phase-to-phase and ground fault. Distance relays have been provided which protect against phase-to-phase faults, three-phase faults, and double line-to-ground faults on a three-phase system. Such an arrangement is disclosed and claimed in my Patent 2,214,866, granted September 17, 1940, and assigned to the same assignee as the present application.

Similarly, distance relays have been provided for protection against single-line-to-ground faults, this latter type of relay involving somewhat different connections due to the different type of fault. Heretofore, when it was desired to provide complete protection against both ground and phase faults for a polyphase system having a grounded neutral, it was necessary to provide a set of distance relays for ground protection and a set of distance relays for phase-fault protection. This doubles the number of relays and, consequently, considerably increases the cost inasmuch as distance relays which have cooperating current and potential windings are relatively complicated and costly. It would be desirable to provide a distance relay protective system for a polyphase circuit wherein one set of relays would properly protect against all types of faults.

Protective systems have been devised for reducing the number of relays required by switching the potential connections of the distance relays under certain conditions as described in my article entitled "Control of distance relay potential connections" appearing at page 206 of volume 53 of Electrical Engineering for January, 1934, and as disclosed and claimed in United States Letters Patent 1,573,624, granted February 16, 1926, to Josef Biermanns, and assigned to the same assignee as the present application. However, in all of the prior-art arrangements, it has been necessary to make some sort of compromise if it is desired to have the distance relays protect against all faults occurring on a polyphase system and, consequently, the reach thereof is not the same for all of the different faults which might occur. It would be desirable to provide a distance relay which would protect against all types of faults and, furthermore, operate similarly for all faults at a predetermined distance from the relay independently of the number of circuit conductors involved in the fault and whether or not ground faults are involved.

It is an object of my invention, therefore, to provide a new and improved protective system involving a minimum number of distance relays for giving complete and accurate protection on all types of faults which might occur.

It is another object of my invention to provide a new and improved protective system employing distance relays wherein the connections of both the current and potential windings of the distance relays are changed under certain conditions to give complete protection for all kinds of faults.

Still another object of my invention is to provide a new and improved protective system in which both the current and potential winding connections of the distance relays are changed in response to the fault conditions existing so that correct distance measurements will be obtained independently of the number of conductors involved in the fault and whether or not ground faults are involved.

Further objects and advantages of my invention will become apparent as the following description proceeds and the features of novelty which characterize my invention will be pointed out with particularity in the claims annexed to and forming a part of this specification.

Figure 2:
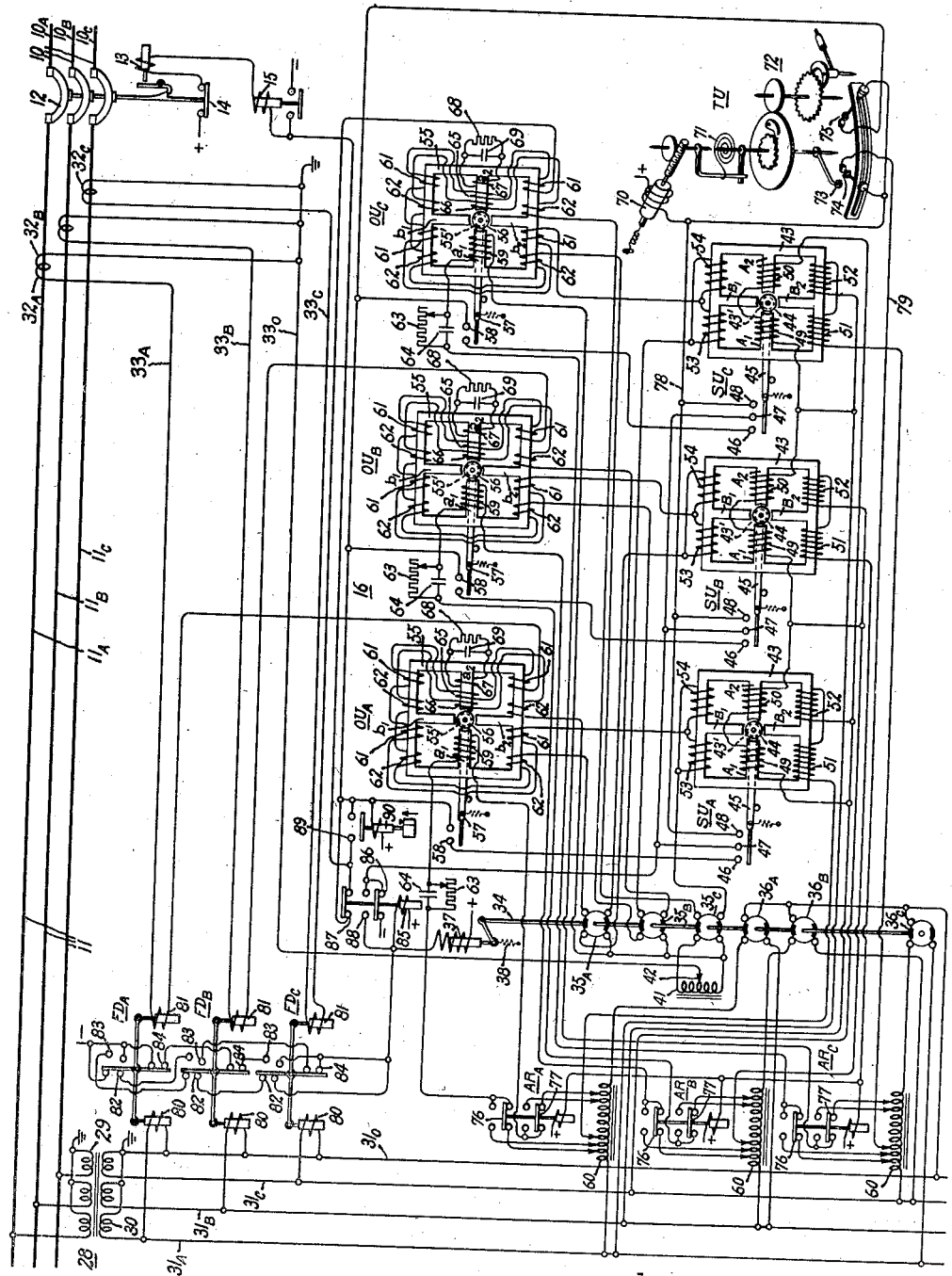

For a better understanding of my invention, reference may be had to the accompanying drawings in which Fig. 1 diagrammatically illustrates a protective system embodying my invention utilizing a polyphase distance relay of the impedance type while Fig. 2 diagrammatically illustrates a protective system embodying my invention utilizing a polyphase distance relay of the reactance type.

Referring now to Fig. 1 of the drawings, I have illustrated my protective system as applied to a three-phase alternating-current system comprising a power line 10 including phase conductors 10A, 10B, and 10C and a polyphase bus 11 including conductors 11A, 11B, and 11C, respectively. The polyphase system comprising power line 10 and bus 11 is illustrated as being interconnected through a suitable circuit-interrupting means such as latched closed circuit breaker 12. This circuit breaker is shown as provided with a trip coil 13 and an "a" auxiliary switch 14 which is closed when the circuit breaker is closed and open when the circuit breaker is open. The circuit of the trip coil 13 may include a seal-in relay 15 to by-pass the more delicate protective relay contacts and to insure a definitely maintained energization of the trip coil once the protective relay contacts have operated to initiate its energization.

In order to protect the polyphase system from faults occurring on power line 10, I provide a polyphase distance relay generally indicated at 16 which comprises three impedance relays 17, specifically designated as 17A, 17B, and 17C, respectively. These impedance relays 17 have been schematically illustrated as of the balanced beam type comprising a beam member 18 centrally pivoted at 19. Each of the impedance type relays 17 is provided with a contact arm 20 adapted to bridge contacts 21. These contacts 21 for the respective impedance type relays 17A, 17B, and 17C are arranged in parallel and connected in the trip circuit of circuit breaker 12 in series with trip coil 13 so that the operation of any one of the impedance relays 17 will cause energization of trip coil 13 and tripping of circuit breaker 12.

As will be obvious to those skilled in the art, the type of impedance relay disclosed does not have directional characteristics and, consequently, would operate in response to faults in either direction from the relay within the critical distance for which it is set to operate. In order to prevent the tripping of circuit breaker 12, therefore, for faults not on the protected section of power line 10, a suitable directional relay or starting unit will be provided, only the contacts 22 of which are shown connected in the circuit of trip coil 13 so that tripping of circuit breaker 12 will not occur unless the fault is in the section of power line 10 being protected.

Each of the balanced beam members 18 of the impedance type relays 17A, 17B, and 17C is provided at one end thereof with a solenoid 23 having a voltage-restraining winding 24. At the other end of each of the beam members 18 is a solenoid 25 having a pair of current windings 26 and 27 having the same number of turns, but one of which is reversely wound with respect to the other, for producing an operating torque to cause bridging of contacts 21 under all fault conditions on the protected section within a predetermined distance from polyphase electroresponsive device 16.

The voltage-restraining windings 24 of impedance type relays 17A, 17B, and 17C, respectively, are energized from the three-phase alternating-current system through a potential transformer 28 having a Y-connected primary winding 29 connected across bus circuit 11. Transformer 28 is also provided with a Y-connected secondary winding 30 having the three phase terminals thereof connected to conductors 31A, 31B, and 31C, respectively, and the neutral terminal connected to conductor 31o. The potential windings, as will be described hereinafter, are arranged to be connected across conductors 31A, 31B, 31C, and 31o in certain predetermined arrangements for various fault conditions.

A plurality of current transformers, each associated with one of the phase conductors 11A, 11B, and 11C are provided for furnishing the source of energization of current windings 26 and 27. These current transformers are illustrated as comprising secondary windings 32A, 32B, and 32C connected in Y relationship having the phase terminals thereof connected to conductors 33A, 33B, and 33C, respectively, and the neutral terminal connected to conductor 33o. The current windings 26 and 27 for each impedance type relay 17, as will be described hereinafter, are arranged to be connected across conductors 33A, 33B, 33C, and 33o in certain predetermined arrangements for various fault conditions. With the connections as shown in Fig. 1, the windings 26 are energized with a current proportional to the current flowing in one of the conductors 11A, 11B, or 11C of the three-phase system while the current flowing in the corresponding current winding 27 associated with the same impedance type relay 17A, 17B, or 17C is proportional to that flowing in the next lagging phase conductor but reversed as to polarity so that windings 26 and 27, when both energzied, produce a flux proportional to the delta sum of the two line currents. This arrangement eliminates the necessity for auxiliary Y-delta current transformers which would otherwise be required in order to energize solenoid 25 with the delta currents desirable for protecting against certain fault conditions.

In any distance relay, if the voltage which is zero at the fault is used to energize the potential windings, then it is a simple matter to calculate the potential drops from the fault to the relay without requiring a consideration of generator voltage, etc. In the case of three-phase faults, phase-to-phase faults, and double phase-to-ground faults, the line-to-line voltages or delta voltages for the phases involved at the fault are zero and, consequently, if line-to-line voltages are used to energize the potential windings, the mathematical proof for showing that the distance relay has the same reach under any of these fault conditions is relatively simple. For a three-phase system, the effective delta voltages might be represented by $$E_A - E_B \qquad (1)$$
$$E_B - E_C \qquad (2)$$
$$E_C - E_A \qquad (3)$$

respectively, where $E_A$, $E_B$, and $E_C$ represent the respective phase or line-to-neutral voltages. The respective line currents in terms of the phase-sequence components could be expressed as follows:

$$I_A = I_1 + I_2 + I_0 \qquad (4)$$
$$I_B = a^2 I_1 + a I_2 + I_0 \qquad (5)$$
$$I_C = a I_1 + a^2 I_2 + I_0 \qquad (6)$$

where $a$ and $a^2$ are rotational operators, the former signifying the rotation of a vector through the angle of 120 degrees in the positive or phase-advancing direction and the latter signifying 240 degrees positive rotation, and $I_1$, $I_2$, and $I_0$ are positive, negative, and zero-phase-sequence currents, respectively. If the line-to-line potential at the fault is zero, then the effective potential at the relay may, in view of Equations 4 and 5, be represented by:

$$E_A - E_B = (I_1 Z_1 + I_2 Z_2 + I_0 Z_0) - (a^2 I_1 Z_1 + a I_2 Z_2 + I_0 Z_0) \qquad (7)$$

where $Z_1$, $Z_2$, and $Z_0$ are the positive, negative, and zero-phase-sequence impedances, respectively from the fault to the point at which the relay potentials are measured. Since, for power lines, $Z_1$ is substantially equal to $Z_2$, Equation 7 may be simplified to:

$$E_A - E_B = (I_1 - a^2 I_1 + I_2 - a I_2) Z_1 \qquad (8)$$

But from Equations 4 and 5

$$(I_1 - a^2 I_1 + I_2 - a I_2) = I_A - I_B \qquad (9)$$

Substituting from Equation 9 in Equation 8 and solving for $Z_1$, $$\frac{E_A - E_B}{I_A - I_B} = Z_1 \tag{10}$$

It will be obvious to those skilled in the art, therefore, that $I_A - I_B$ represents effective delta current for the particular phases considered and, consequently, if the potential and current windings of impedance relays 17 are energized with delta potentials and delta currents, respectively, the distance relay will measure the positive-phase-sequence impedance from the relay to the fault for all fault conditions where the line-to-line or delta voltage is zero at the fault, i. e., three phase, phase-to-phase, and double line-to-ground.

The above calculations are not satisfactory for a single line-to-ground fault, however, for, in that case, none of the line-to-line voltages at the fault are necessarily zero. However, if the line-to-neutral voltage were used for energizing the potential winding of the impedance relay, then the voltage at the fault is zero assuming a negligible ground resistance and the potential at the relay may be represented merely as the sum of the positive, negative, and zero-phase-sequence impedance drops from the fault to the relay as:

$$E_A = I_1 Z_1 + I_2 Z_2 + I_0 Z_0 \tag{11}$$

Equation 11 may be considerably simplified when it is remembered that $Z_1 = Z_2$ and, further, by adding to and subtracting from the right-hand expression of the above equation the term $I_0 Z_1$. Then, $$E_A = (I_1 + I_2 + I_0) Z_1 + I_0 (Z_0 - Z_1) \tag{12}$$

Since, from Equation 4, $$I_1 + I_2 + I_0 = I_A$$

Equation 12 may be written as $$E_A = I_A Z_1 + (Z_0 - Z_1) I_0 \tag{13}$$

If both sides of Equation 12 are divided by the following term:

$$I_A + I_0 \left( \frac{Z_0 - Z_1}{Z_1} \right)$$

it reduces to $$\frac{E_A}{I_A + \left( \frac{Z_0 - Z_1}{Z_1} \right) I_0} = Z_1 \tag{14}$$

$$\frac{Z_0 - Z_1}{Z_1} I_0$$

may be represented by $KI_{Residual}$, where $K$ is a constant and $I_{Residual}$, is the sum of the zero phase sequence components of current in the three phases, so that Equation 14 may be written $$\frac{E_A}{I_A + KI_{Residual}} = Z_1 \tag{15}$$

It will be observed by comparing Equations 10 and 15 that, if the potential and current windings of the distance relay are energized with Y or line-to-neutral potentials and line plus a predetermined amount of residual current, the relay will have the same reach for single line-to-ground faults as it has for all other faults when delta currents and voltages are applied to the windings of the distance relay. In the case of double line-to-ground faults, both the line-to-line voltages and the line-to-neutral voltages are zero at the fault so that either Equation 10 or Equation 15 is applicable.

In order to change the currents and potentials applied to impedance relays 17A, 17B, and 17C, respectively, for single line-to-ground faults as contrasted with three-phase, phase-to-phase, etc. faults, I have provided a suitable switching means, generally indicated at 34 and schematically illustrated as comprising rotary switches 35A, 35B, and 35c, for switching the current circuits and rotary switches 36A, 36B, and 36c for switching the potential connections of the impedance relay 17. Any suitable means for operating rotary switching means 34, such as solenoid 37, may be provided. A suitable spring 38 is provided normally to hold rotary switching means 34 in the position shown so that solenoids 23 and 25 are energized respectively with effective delta voltages and delta currents so that electroresponsive device 16 responds to three-phase, phase-to-phase, and double line-to-ground faults.

I have provided a suitable ground-fault relay 39 connected in the residual current circuit of the current transformers having secondary windings 32A, 32B, and 32c for controlling the energization of solenoid 37 and, consequently, for changing the connections to current windings 26 and 27 and potential windings 24 of impedance relays 17. This ground-fault relay 39 is adapted to close contacts 40 and complete the energization circuit of solenoid 37 whenever a ground fault exists on the polyphase alternating-current circuit, whereby rotary switching means 35A, 35B, and 35c change the effective delta energization of solenoids 25 to line current plus a predetermined amount of residual current and rotary switches 36A, 36B, and 36c change the energization of solenoids 23 from line-to-line potentials to line-to-neutral potentials. It will be understood by those skilled in the art that, instead of a single rotary switching means 33 such as disclosed, separate switching means for the current and potential circuits may be provided and I have found that relays of the type disclosed and claimed in a copending application of Harold T. Seeley, Serial No. 267,434, filed April 12, 1939, and assigned to the same assignee as the present application, are particularly applicable.

In order to adjust for the proper value of K in Equation 15 above, I have provided an autotransformer 41 having an adjustable tap 42 by means of which the amount of residual-current compensation may be adjusted.

The operation of my distance relay protective system illustrated in Fig. 1 will be obvious to those skilled in the art in view of the detailed description included above. The electroresponsive device 16 will have the same reach for any of the types of faults normally occurring on power line 19 in view of the switching means provided for transferring both the current and potential connections under ground-fault conditions. Furthermore, if a fault should begin as one type of fault and then change to another type, electroresponsive device 16 will still operate satisfactorily. For example, if a single line-to-ground fault changes to a double line-to-ground fault, electroresponsive device 16 will operate satisfactorily for the latter type of fault for either set of connections, namely, with delta potential and delta current connections or Y potential and Y plus residual current connections. However, it will be obvious to those skilled in the art that, whenever a ground fault occurs whether it be a single line-to-ground or double line-to-ground, the residual current flowing through ground-fault relay 39 will cause switching means 34 to operate and provide current connections for energizing solenoid 25 in response to phase current plus a predetermined amount of residual current while the potential windings 24 are energized with line-to-neutral voltages.

It will be observed by those skilled in the art that, with the connections as shown in Fig. 1 and neglecting load currents, the same reach on all faults except single line-to-ground faults will be obtained. Furthermore, if the connections obtained when switching means 34 is operated were permanently provided, the same reach on all faults except phase-to-phase faults would be provided.

Although I have described my invention thus far as applied to a polyphase distance relay of the impedance type, it will be obvious to those skilled in the art that it is equally applicable to polyphase distance relays of the reactance type. Accordingly, in Fig. 2 I have illustrated my invention as applied to a polyphase reactance relay of the type disclosed and claimed in my Patent 2,214,866 referred to above. The corresponding parts of Fig. 2 are designated by the same reference numerals as in Fig. 1. The polyphase distance relay generally indicated at 15 in Fig. 2 comprises starting units $SU_A$, $SU_B$, and $SU_C$ associated with the phases A, B, and C of the three-phase alternating-current circuit, and the corresponding ohm units $OU_A$, $OU_B$, and $OU_C$, the corresponding auxiliary relays $AR_A$, $AR_B$, and $AR_C$, respectively, and a common timing unit TU.

Since the structure of the starting units SU, the ohm units OU, and the auxiliary relays AR are identical for each phase, only one of each of these different types of units will be described and the same reference numerals will be used to designate the corresponding parts of the other units for the other phases.

The structure of the starting units SU may be of the type disclosed in United States Reissue Patent 21,813, granted May 27, 1941, upon an application of V. E. Verrall, and assigned to the same assignee as the present application. As shown schematically in Fig. 2, each of these starting units SU comprises a hollow magnetic stator 43 having two angularly displaced pairs of inwardly projecting salients, $A_1$, $A_2$, $B_1$, and $B_2$. Centrally positioned relatively to and spaced from the ends of these salients is a magnetic member or stator 43', as described in said Verrall patent and shown dotted in Fig. 2, since it is covered by a rotor 44 of electric current-conducting material which is preferably in the form of a generally cylindrical cup and is mounted to rotate in the gaps between the central stator 43' and the ends of the salients. A contact-controlling member 45 movable with the rotor 44 is arranged to control the contacts 46, 47, and 48 which cooperate in the control of the energization of the trip coil 13 and also in the control of the timing unit TU and the associated auxiliary relays AR as will be described in greater detail hereinafter.

In order to secure the desired directional action or response to the direction of fault power flow, the starting units SU are constructed with an operating characteristic of the form $$K_1 E_A I_A f(\phi) - K_2 E_A E_B f(\theta)$$

or, in other words, a power directional torque opposed by a voltage restraint torque. $K_1$ and $K_2$ being constants $E_A$ and $E_B$ voltages, and $I_A$ a current of the circuit, $f(\phi)$ a function of the phase angle between $E_A$ and $I_A$, and $f(\theta)$ a function of the phase angle between $E_A$ and $E_B$. Thus, referring to starting unit $SU_A$, the salients $A_1$ and $A_2$ are provided with polarizing windings 49 and 50, respectively, connected in series with each other and arranged to be energized by the voltage between phase conductors $11_B$ and $11_C$, respectively, as derived from potential transformer 28. This voltage corresponds to the voltage between the phase conductors $10_B$ and $10_C$ of the circuit under protection. The windings 49 and 50 are so arranged as to provide a flux in the same direction across the gap between the ends of the salients $A_1$ and $A_2$. On the stator 43 on opposite sides of the salients $B_2$, there are voltage-restraining windings 51 and 52, respectively, connected in series and arranged to be energized by the voltage between phase conductors $11_A$ and $11_B$ so that both windings produce flux in the same direction in the salient $B_2$. The flux of the windings 51 and 52 thus cooperates with the flux of the windings 49 and 50 to provide a restraining torque on the rotor 44 which is proportional to the product of the voltages energizing the windings and a function of the phase angle between these voltages.

In order to obtain the desired power directional torque, the stator 43 is provided with current windings 53 and 54 to produce a flux in the salient $B_1$ which cooperates with the flux in the salients $A_1$ and $A_2$ to produce an operating torque on rotor 44. Inasmuch as it is necessary to obtain reliable directional action even on faults close to the bus 11, causing heavy currents at low voltage, it is necessary to eliminate any torques due to current alone in consequence of any dissymmetry in the distribution of flux on the current salient $B_1$. The effect of any such dissymmetry in the flux may be considered as a cross flux flowing between the salients $A_1$ and $A_2$ which are at right angles to the salient $B_1$. This cross flux would react with the flux in the salient $B_1$ to produce an unwanted torque. In order to eliminate this undesirable torque, the current windings 53 and 54 are placed on opposite sides of the salient $B_1$ and each has substantially the same number of turns so that, when energized by the same alternating-current quantity, each develops substantially the same magnetomotive force to produce substantially the same flux between the salient $B_1$ and each of the salients $A_1$ and $A_2$. Further, to achieve this purpose, these windings are connected in parallel so that they have the same voltage across them and, since their turns and voltages are the same, their fluxes are the same, consequently, there will be no dissymmetry in the distribution of flux from the current salient $B_1$ or no apparent cross flux effects between the salients $A_1$ and $A_2$. This arrangement of windings is disclosed and claimed in my prior Patent 2,214,867, granted September 17, 1940, and assigned to the same assignee as the present application. In the case of the starting unit $SU_A$, the current windings 53 and 54 are connected in series with the secondary winding $32_A$ of the current transformer associated with phase conductor $10_A$.

The structure of the ohm units OU may also be of the type disclosed in the above-mentioned Verrall patent and, as shown schematically, comprise a hollow magnetic stator 55 having two angularly displaced pairs of inwardly projecting salients $a_1$, $a_2$, $b_1$, $b_2$. Centrally positioned relatively to and spaced from the ends of the salients is a magnetic member or stator 55' shown dotted since it is covered by a rotor 56 of electric current-conducting material which, in the form of a generally cylindrical cup, is mounted to rotate in the gaps between the central stator 55' and the ends of the salients $a_1$, $a_2$, $b_1$, $b_2$. A contact-controlling member 57 movable with the rotor 56 is arranged to control contacts 58 which cooperate in the control of the energization of trip coil 13 as will be described hereinafter.

In order to secure the desired ohmic response or distance-measuring action, the ohm units OU have an operating characteristic of the form $$K_3 I^2 - K_4 E I f_1(\phi)$$

where $K_3$ and $K_4$ are constants, E and I, respectively, a voltage and a current derived from the circuit, and $f_1(\phi)$ a function of the phase angle between them, which will be a sine function where the distance response is based on the reactance of the circuit. Referring specifically to ohm unit OU$_A$, the salient $a_1$ is provided with a potential winding 59 connected to be energized in accordance with the voltage between the phase conductors 11$_A$ and 11$_B$ as derived from the potential transformer 28 through a variable tap auto-transformer 60. On the stator 55 on each side of the salients $b_1$ and $b_2$ are current windings 61 and 62 which are respectively connected to be energized in accordance with two different line conductor currents for the particular ohm unit OU$_A$, these currents being proportional to the currents flowing in phase conductors 11$_A$ and 11$_B$, respectively. The connections to the secondary windings 32$_A$ and 32$_B$ of the current transformers associated with phase conductors 11$_A$ and 11$_B$ are such that one of the current-energized windings, such as winding 61, has current from one phase, such as phase A, and the other winding, such as 62, has current from the next lagging phase such as B but reversed as to polarity so that the two windings produce a flux proportional to the delta sum of the two currents. This arrangement eliminates the necessity for auxiliary Y delta current transformers which would otherwise be required to obtain a delta current for energizing ohm units OU to protect against phase-to-phase, three-phase, and double phase-to-ground faults when switching means 34 is in the position shown. In order to insure correct distance response in the case of three-phase faults, the windings 61 and 62 are divided so that there are equal portions thereof on either side of the salients $b_1$, $b_2$. This arrangement minimizes cross flux in the salients $a_1$, $a_2$ which would add to the $I^2$ torque, thus necessitating an extra compensating adjustment to make different ohm units have the same calibration. The potential winding 59 and the current windings 61 and 62 produce interacting fluxes which provide the restraining torque on rotor 56.

Further, in order to have the desired sine function of $\phi$ as well as to satisfy other conditions, I connect in series with the potential windings 59 a resistance 63 and a parallel connected condenser 64. These are so proportioned with respect to the inductance of the potential circuit as to have this circuit resonant at unity power factor in order to enable the unit to respond only to the reactive component of the ohmic measurement and, further, to make the potential circuit dead beat so as to prevent incorrect operation in the event of sudden changes of line voltage when a fault occurs and also to make the current in the potential circuit at a given voltage of such a value as to cause the unit to operate at a desired ohmic value. These three conditions can readily be fulfilled because there are three variables involved in three independent equations as disclosed in my prior Patent 2,131,603, granted September 7, 1938, and assigned to the same assignee as the present application.

In order to obtain the desired $I^2$ torque, the windings 61 and 62 are also arranged with the necessary number of turns on the salient $a_2$ as illustrated by the windings 65 and 66 to provide a current flux which cooperates with the current flux between the salients $b_1$ and $b_2$. Since these two fluxes are in phase, I provide a phase-shifting winding 67 on the salient $a_2$ and connect in circuit therewith the parallel connected resistance 68 and capacitor 69. Here again, relatively to the inductance of the circuit of the winding 67, the resistance 68 and the capacitor 69 are so proportioned that the flux in the salient $a_2$ is shifted a suitable amount to obtain adequate torque from the interaction of the flux of salient $a_2$ with the current flux between the salients $b_1$ and $b_2$ and further so that the ohmic response may not vary over a large range of current due to local saturation and so that this circuit may also be critically damped to prevent incorrect operation due to sudden changes in current or voltage consequent upon system transients.

In order to obtain a compact arrangement of the various units, the ohm and starting units are arranged generally with their stators 43 and 55 in parallel planes, one above the other, although, in the drawing, they are shown schematically with the stators shown revolved into the same plane.

In consequence of the nearness of their magnetic fields, it is necessary to insure that the relative positions of the stators do not introduce further bias torques in consequence of fluxes fringing or leaking from the poles of some salients on one stator in such a manner as to induce potentials on the windings of another stator. Thus, for example, I so arrange the starting unit that the potential salients $A_1$, $A_2$ are angularly displaced with respect to the current salients $b_1$, $b_2$ of the ohm unit so that the leakage flux from the current salients will not induce a potential in the polarizing windings 49, 50 of the starting unit and thereby tend to cause erroneous action at low voltage with high currents. As a matter of practical construction and arrangement of the parts, the salients $b_1$, $b_2$ of the ohm unit are at right angles to the salients $A_1$, $A_2$ of the starting unit.

In order to provide a stepped time-distance characteristic such that the circuit breaker 12 may be tripped substantially instantaneously for all faults within the section of the power line 10 between the bus 11 and the next adjacent section for all faults up to a given percentage of length, for example ninety per cent of the protected line section extending from the bus 11 and a time delay tripping for faults beyond this point and over a predetermined range of distance in the next section, and a still greater time limit for tripping to take care of conditions which may arise due to failure of some particular relay, I provide a timing unit TU and means, such as the auxiliary relays AR, for automatically varying the reactance setting of the ohm unit. As shown, the timing unit includes an electromagnetic motor unit 70 which, when energized, stores energy in a spring 71. This energy is released through an escapement mechanism 72 to actuate a movable contact 73 to engage different sets of adjustably positioned contacts 74 and 75 after a time delay dependent upon the positioning of these contacts and the initial position of the movable contact 73. The auxiliary relays AR, through their movable contacts 76 and 77, change the ohmic setting of the ohm unit by varying the tap connections of the autotransformer 60 and thus changing the voltage on the voltage winding 59 so that, with only one ohm unit, at least two reactance settings may be provided.

In order to minimize the possibility of incorrect tripping in consequence of an artificial reduction in the circuit reactance due to an oscillatory condition on the power system, I may arrange the starting and timing units and the auxiliary relay to control the ohmic setting of the ohm unit so as momentarily to decrease the ohmic setting of the ohm unit a predetermined time after the response of the starting unit. For this purpose, the contacts 47 and 48 of each of the starting units are connected in parallel in the circuit 78 of the winding of the timing unit motor element 79 and also in parallel in the circuit of the windings of the auxiliary relays through the contacts 73, 74 of the timing unit in series and the conductor 79.

Each of the auxiliary relays AR is provided with the necessary circuit-restoring means, such as gravity, which returns the contacts 76 and 77 to the initial ohmic setting when the winding of the auxiliary relay is deenergized. Since the timing unit contacts 74 are closed only momentarily, it may be desirable to provide a short time delay in the auxiliary relay which can be obtained by suitable means well known to those skilled in the art.

With this arrangement, each ohmic setting is assured only for the period during which the moving contact of the timing unit is touching the corresponding stationary contact. When it leaves the contact, the ohm unit is returned to its original setting which reduces its zone of operation. In this way, the back-up zone or zones of protection will only be available for short periods (long enough to allow tripping) and, during the majority of the times, the setting will be on the first or shortest zone, which makes the relay less liable to trip on power swings.

The usual arrangement of distance relays is to have the ohm unit continue on a given ohmic setting until changed to the next one and staying on that one until the next change. As will be apparent to those skilled in the art, this stepped time-distance characteristic can also be obtained by providing contacts on the auxiliary relay AR for each step to seal it in so that it may stay in the operated position after the timing unit contact has passed by the contact corresponding to a given ohmic setting.

As in Fig. 1, the switching means 34 is provided to change the current and potential connections of the ohm units and starting units when a ground fault is involved. For three-phase faults and phase-to-phase faults, the electroresponsive device 16 is energized with delta currents and delta voltages in a manner very similar to the corresponding device of Fig. 1. In the event of a single line-to-ground fault, switching means 34 is operated as will be described hereinafter so as to energize electroresponsive device 16 with line-to-neutral voltages and with line currents plus a predetermined proportion of residual current. The rotary switches 35A, 35B, and 35c change the current connections of windings 62 and 66 of the ohm units OU from line current in the case of phase-to-phase and three-phase faults to a predetermined proportion of residual current in the case of single line-to-ground faults. The remaining current windings of the ohm and starting units are not affected by the operation of switching means 34. The rotary potential switches 36A, 36B, and 36c change the energization of potential restraining windings 51 and 52 of the starting units SU and the energization of potential windings 59 of ohm units OU from effective delta potentials during phase-to-phase and three-phase faults to line-to-neutral potentials during single line-to-ground faults. It will be observed that the connections for the polarizing windings 49 and 50 of the starting units are not affected by the operation of switching means 34.

Although I have shown by equations 10 and 15 above that an impedance type relay, such as is disclosed in Fig. 1, will have the same reach for double line-to-ground faults whether the windings are energized with delta voltage and delta current or line-to-neutral voltage and line plus a predetermined amount of residual current, I have found that in the case of a reactance relay this does not follow, since instead of measuring positive-phase-sequence impedance as an impedance relay, the reactance relay will measure the positive-phase-sequence impedance multiplied by the sine of the angle between the currents and voltages involved, i. e., $Z_1 \sin \phi$ or $X_1$, assuming negligible fault resistance. In a double line-to-ground fault, the extra fault current flowing between the phases may reduce the angle $\phi$ so that the reactance measured is falsely small. Consequently, with the protective system shown in Fig. 2, I have provided an arrangement for restoring the delta voltage and delta current connections to the distance relay 16 in the event that a single line-to-ground fault changes to a double line-to-ground fault. To this end, I provide means for distinguishing between a double line and single line-to-ground fault which might comprise ordinary overcurrent relays but which I have chosen to represent as impedance type fault detectors FDA, FDB, and FDc, respectively. Each of these fault detectors is provided with a potential winding 80 which is connected across the output of potential transformer 28 so as to be energized with the respective line-to-neutral voltages of the three-phase alternating-current circuit being protected. Similarly, each of these fault detectors is provided with a current winding 81 energized in response to the respective line currents as derived from the secondary windings 32A, 32B, and 32c of the current transformers associated with the three-phase power circuit. Each of the fault detectors is provided with a plurality of sets of normally closed contacts 82 and 84, and one set of normally open contacts 83. These contacts are so arranged that, under normal conditions of the power circuit, no potential is applied to solenoid 37 for operating switching means 34. If only a single one of the fault detectors FDA, FDB, FDc should operate to open normally closed contacts 82 and 84 and close normally open contacts 83, solenoid 37 will be energized. If, however, more than one of the fault detectors FD operate to close contacts 83, then solenoid 37 is deenergized and spring means 38 restores the delta voltage and delta current connections to distance relay 16.

In the event of a single line-to-ground fault which changes to a double line-to-ground fault, it is necessary to interrupt the tripping circuit while the change in potential and current connections of the reactance type of distance relay is made to avoid false tripping in the event that the reactance measured under double line-to-ground conditions is falsely small. Accordingly, I provide a trip-control relay 85 and a time-delay relay 90. Trip-control relay 85 is provided with normally closed contacts 86 and 87 and normally open contacts 88 while time-delay relay 90 is provided with normally open contacts 89. Under unfaulted conditions of a protective circuit or upon the occurrence of phase-to-phase, three-phase, or double line-to-ground faults, the tripping circuit for circuit breaker 12 is completed through the contacts 58 of the ohm units OU and the contacts 46 and 47 of the starting units SU and the normally closed contacts 86 of trip-control relay 85 as well as the normally closed contacts 87 thereof. In the event of a single line-to-ground fault, a circuit is completed through the fault detectors FD$_A$, FD$_B$, and FD$_C$ to energize trip-control relay 85, thereby opening contacts 86 and 87 and providing a new tripping circuit which includes the circuit through the fault detectors FD$_A$, FD$_B$, and FD$_C$, the contacts 88 of trip-control relay 85, the contacts 46 and 47 of the starting unit SU, the contacts 58 of the ohm unit OU, and the contacts 89 of trip-control relay 90, whereupon control of the tripping circuit may be obtained so as to restore initial conditions in the event the single line-to-ground fault changes to a double line-to-ground fault. Time-delay relay 90 having an instantaneous drop-out and a time-delay pickup is provided to give the necessary time delay and prevent false tripping when a single line-to-ground fault changes to a double line-to-ground fault. Even though a single line-to-ground fault exists outside of the protected section, one of the fault detectors FD will be energized to close its contacts 83 thereby energizing solenoid 37 and trip-control relay 85. The energization of solenoid 37 will operate switching means 34 to insure the necessary connections for the distance relay 16 to operate properly on single line-to-ground faults. The corresponding starting unit SU will also close its contacts but the ohm unit OU will not operate as long as the fault is outside of the protected section. The trip coil 13 of circuit breaker 12 cannot be energized until time-delay relay 90 picks up which cannot occur until both the corresponding starting unit and ohm unit close their contacts 46, 47 and 58, respectively. If the external single line-to-ground fault changes to a double line-to-ground fault, the ohm unit might reach farther than it correctly should as mentioned above and close its contacts, whereupon time-delay relay 90 would be energized. The time delay is provided to prevent false tripping by enabling switching means 34 to reset upon the operation of a second fault detector FD, whereupon the ohm unit OU, now having the proper delta voltage and current connections, will reopen its contacts if the fault is external of the protected section so that the tripping circuit for the circuit breaker 12 will not be completed.

The operation of the protective arrangement illustrated in Fig. 2 will be understood by those skilled in the art in view of the detailed description included above particularly since the operation of Fig. 1 was described above. Whenever a phase-to-phase, three-phase, or double line-to-ground fault occurs on the protected section, the connections shown in Fig. 1 will be maintained for the distance relay 16 so that the correct operation under these faults will be obtained. In the event of a single line-to-ground fault, switching means 34 operates to change the connections so that the reactance relay will again measure the same distance as under the other fault conditions. If the single line-to-ground fault should change to a double line-to-ground fault, a sufficient time delay is provided to allow switching means 34 to restore the connections shown in Fig. 2. It will be observed, therefore, that I have provided a polyphase distance relay which will operate correctly and have the same reach for every type of fault which exists on the protected section.

While I have described what I at present consider the preferred embodiments of my invention, it will be obvious to those skilled in the art that various changes and modifications may be made without departing from my invention and I therefore, aim in the appended claims to cover all such changes and modifications as fall within the true spirit and scope of my invention.

What I claim as new and desire to secure by Letters Patent of the United States is:

1. In a protective system for an electric circuit comprising an electroresponsive device having current windings and a potential winding, means for normally connecting said potential winding for energization in accordance with the potential between two of the conductors of said circuit and for connecting said current windings so as to be energized in response to the line current flowing in said conductors, and means operative in response to a ground fault on said circuit for connecting said potential winding for energization in accordance with the potential to ground of the grounded conductor and for energizing said current windings in accordance with the sum of the line and a predetermined proportion of the residual currents.

2. In a protective system for an electric circuit, circuit-interrupting means for controlling the energization of said circuit, an electroresponsive device operable on the distance principle for controlling the operation of said circuit-interrupting means upon the occurrence of a fault on said electric circuit, said electroresponsive means comprising for each phase of said electric circuit one potential and two current windings energized respectively from said electric circuit, and means for changing the connections of the potential winding and one of said current windings under certain predetermined fault conditions so that said electroresponsive device has the same reach for all faults which might occur on said electric circuit.

3. In a protective system for an electric circuit, circuit-interrupting means for controlling the energization of said circuit, an electroresponsive device operable on the distance principle for controlling the operation of said circuit-interrupting means upon the occurrence of a fault on said electric circuit, said electroresponsive means comprising for each phase of said electric circuit one potential and two current windings adapted to be energized from said electric circuit, means for energizing said potential winding and one of said current windings with line-to-line voltages and line currents, respectively, under most fault conditions, and means for changing these connections under certain predetermined fault conditions so that said potential winding is energized with line-to-neutral voltages and said one current winding is energized with residual current, whereby said electroresponsive device has the same reach for all types of faults which might occur on said electric circuit.

4. In a distance-responsive relay for protecting a polyphase alternating-current circuit comprising for each phase of said polyphase circuit one potential and two current windings adapted to be energized from said circuit, means for energizing said potential winding and one of said current windings with line-to-line voltages and line currents, respectively, under most fault conditions, and means for changing these connections under certain predetermined fault conditions so that said potential winding is energized with line-to-neutral voltage and said one current winding is energized with residual current, whereby said electro-responsive device has the same reach for all types of faults which might occur on said polyphase alternating-current circuit.

5. In a protective system for an electric circuit comprising a polyphase reactance relay having current and potential windings, means for normally connecting said potential windings for energization in accordance with the potential between two of the conductors of said circuit and for connecting said current windings so as to be energized in response to the line currents flowing in said conductors, means operative in response to a single line-to-ground fault on said circuit for connecting said potential windings for energization in accordance with the line-to-neutral voltages of said circuit and for energizing said current windings with line and residual currents, respectively, and means for restoring the first-described connections in the event that said single line-to-ground fault changes to a double line-to-ground fault.

6. In a distance-responsive relay of the reactance type for protecting a polyphase alternating-current circuit comprising current and potential windings, means for normally energizing said current and potential windings from said electric circuit in a predetermined manner under most fault conditions, means for changing these connections upon the occurrence of a line-to-ground fault on said circuit so that said distance-responsive relay has the same reach for all types of faults which might occur on said electric circuit, and means for restoring said normal connections in the event that said single line-to-ground fault changes to a double line-to-ground fault.

7. In a distance-responsive relay of the reactance type for protecting a polyphase alternating-current circuit, a plurality of current and potential windings, means for normally energizing said current and potential windings from said electric circuit in a predetermined manner under most fault conditions, means for changing these connections upon the occurrence of a single line-to-ground fault on said circuit, means for restoring said normal connections in the event that said single line-to-ground fault changes to a double line-to-ground fault, and time-delay means for rendering said distance-responsive relay ineffective for a sufficient time to allow said normal connections to be restored in the event that said single line-to-ground fault changes to a double line-to-ground fault so that said distance-responsive relay has the same reach for all types of faults which might occur on said electric circuit.

8. In a distance-responsive relay of the reactance type for protecting a polyphase alternating-current circuit, an ohm unit for each phase of the circuit, a plurality of starting units respectively associated with said ohm units, a potential winding and a pair of current windings for each of said ohm units, means for normally energizing said potential and current windings from said polyphase alternating-current circuit in a predetermined manner under all fault conditions except single line-to-ground faults, switching means for changing the energization circuits of said potential and current windings upon the occurrence of a single line-to-ground fault, means for distinguishing between a single line-to-ground and all other types of faults for controlling the operation of said switching means, and means for restoring said energization circuits to their normal form in the event that said single line-to-ground fault changes to some other type of fault.

9. In a distance-responsive relay for protecting a polyphase alternating-current circuit, a plurality of windings including a current and a potential winding, means responsive to a first predetermined fault condition for energizing said current and potential windings from said circuit in a predetermined manner, means for energizing said current and potential windings from said circuit in a different predetermined manner in the event of a second predetermined fault condition, and time delay means for rendering said distance-responsive relay ineffective for a sufficient time to prevent false operation thereof under a third predetermined fault condition following said first predetermined fault condition.

10. In a protective system for an electric circuit, circuit-interrupting means for controlling the energization of said circuit, a distance-responsive device of the reactance type for causing the operation of said circuit-interrupting means upon the occurrence of a single line-to-ground fault on said circuit, a plurality of windings for said device including a current and a potential winding energized from said circuit, and means for rendering said distance-responsive device ineffective to operate said circuit-interrupting means for a sufficient period of time to prevent false operation thereof when a single line-to-ground fault beyond the proper reach of said device changes to a double line-to-ground fault.

ALBERT R. van C. WARRINGTON.

CERTIFICATE OF CORRECTION.

Patent No. 2,315,468.  March 30, 1943.

ALBERT R. van C. WARRINGTON.

It is hereby certified that error appears in the printed specification of the above numbered patent requiring correction as follows: Page 8, first column, line 33, claim 6, before the word "line" insert --single--; and that the said Letters Patent should be read with this correction therein that the same may conform to the record of the case in the Patent Office.

Signed and sealed this 18th day of May, A. D. 1943.

(Seal)

Henry Van Arsdale,
Acting Commissioner of Patents.